May 9, 1939.　　　　　E. PADDEN　　　　　2,157,429
CLUTCH THROW-OUT COLLAR
Filed Dec. 16, 1937
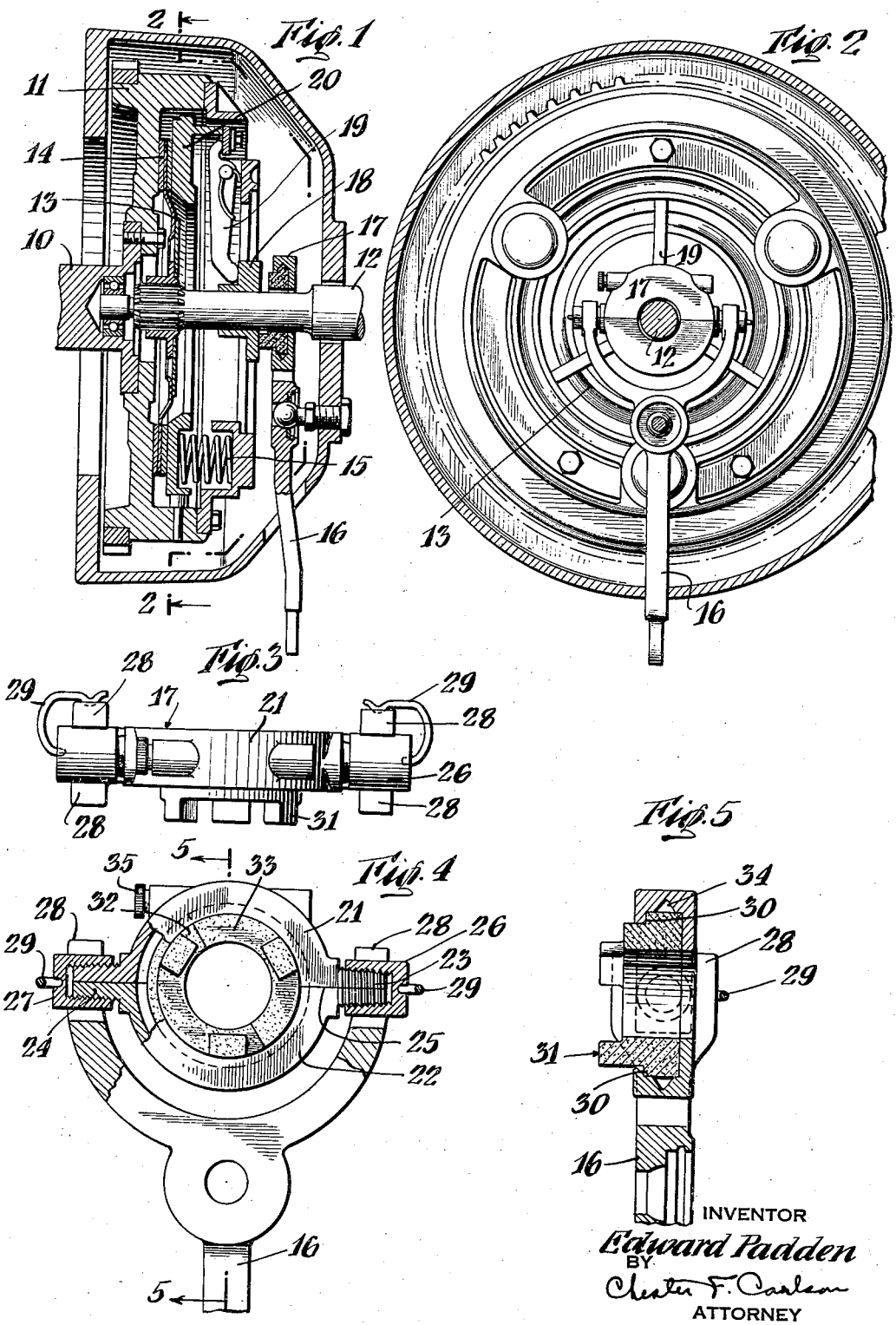
INVENTOR
Edward Padden
BY
Chester F. Carlson
ATTORNEY Patented May 9, 1939

2,157,429

UNITED STATES PATENT OFFICE 2,157,429

CLUTCH THROW-OUT COLLAR

Edward Padden, St. Albans, N. Y.

Application December 16, 1937, Serial No. 180,060

4 Claims. (Cl. 192—98)

This invention relates to clutch throw-out collars for automobiles.

An object of the invention is to improve such collars and render them more readily replaceable.

Other objects of the invention will be apparent from the following description and accompanying drawing taken in connection with the appended claims.

The invention comprises the features of construction, combination of elements, arrangement of parts, referred to above or which will be brought out and exemplified in the disclosure hereinafter set forth, including the illustrations in the drawing.

In the drawing:

Figure 1 is a section through an automobile clutch mechanism containing a clutch throw-out collar embodying my invention;

Figure 2 is a section on the line 2—2 of Figure 1;

Figure 3 shows the clutch collar with part of the clutch arm for actuating the same;

Figure 4 is a face view of the collar and clutch arm; and

Figure 5 is a section on the line 5—5 of Figure 4.

According to my invention I provide a split collar and trunnion which may be readily assembled and disassembled.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to the drawing the clutch mechanism shown in Figures 1 and 2 comprises the automobile crank shaft 10 carrying fly wheel 11, and driven shaft 12 carrying clutch plate 13. The drive shaft and driven shaft are normally coupled together by the co-operating clutch surfaces at 14 which are held tightly in engagement by pressure springs 15.

The clutch is adapted to be disengaged at will of the operator by means of clutch throw-out arm 16 (usually connected to the clutch pedal lever of the automobile) carrying clutch throw-out collar 17 which bears against clutch sleeve 18 when the throw-out arm is actuated. Sleeve 18 in turn actuates radial lever arms 19 to withdraw the spring-pressed ring plate 20 thereby disengaging the clutch.

My invention concerns itself principally with the construction of clutch throw-out collar 17. Heretofore clutch throw-out collars of this type have been formed of a single cast metal ring having a pair of opposite integral supporting trunnions and having an annular recess in the engagement face in which was fitted an annular carbon or graphite block which served as a bearing to slide on clutch sleeve 18. The carbon block eventually wears out and necessitates replacement by a new collar and carbon. This has always necessitated a costly and time consuming repair job since the clutch and surrounding parts had to be disassembled and driven shaft 12 withdrawn before a new collar could be put into place.

I am aware that two-piece clutch collars have already been proposed for certain uses but none of them have proven suitable for automobile clutch members, especially for certain popular makes of automobiles, because of insufficient space in which to accommodate the bolts or other securing means necessary to hold the parts together. It will be appreciated that the collar is a relatively thin shell and would require considerable thickening and enlargement in order to accommodate bolts. Also the collar must operate in a limited space where the bolt heads could not find clearance.

According to my invention collar 17 is split diametrically into two halves, 21 and 22, the dividing plane 25 extending through the trunnion portions 23 and 24, as shown in Figure 4. The trunnion portions are both tapered so as to be smaller at their outer ends and are threaded to receive internally tapered and threaded sleeve caps 26 and 27. Thus when caps 26 and 27 are screwed onto the split trunnion portions 23 and 24 the two halves are tightened together and the collar is held rigidly as a unitary assembly.

The outer cylindrical surfaces of caps 26 and 27 serve as bearings whereby the collar is pivoted in the forked portions 28 of throw-out arm 16. The collar is held in the forked arm by spring clips 29 which fit into axial sockets provided in the caps and if desired, the trunnion portions.

The halves 21 and 22 of collar 17 are recessed at 30 to receive the carbon bearing 31. Bearing 31 is split into two halves 32 and 33. An oil groove 34 is also preferably provided to supply oil to the carbon, the oil being injected through oil cup 35 in half 21 of the collar.

When a carbon bearing wears out it is only necessary to remove arm 16 and screw caps 26 and 27 whereupon the whole collar assembly may be removed. The two halves of a new carbon may then be placed around the shaft, the halves 21 and 22 of the collar fitted over the carbons and the screw caps replaced. The whole repair job can readily be done in a very short time.

Another advantage of my invention resides in the fact that it is not necessary to insert a new collar and carbon each time a carbon wears out. The carbon only needs to be replaced since it can be fitted into the halves of the old collar.

It will be understood that other styles and compositions of bearings may be used with my novel collar and that the split in the bearing may or may not coincide with split in the collar. Moreover it is evident that the split need not be a plane but can have reentrant or dovetailing portions or may be in one plane in the collar portion and in another plane in the trunnions.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A clutch throw-out collar comprising a ring portion and two oppositely disposed trunnion portions thereon, said collar being split into two separable parts, the split extending through said trunnion portions, said trunnion portions being threaded, and internally threaded sleeves screwed onto said trunnion portions to hold the clutch throw-out collar assembled.

2. A clutch throw-out collar comprising a ring portion and two oppositely disposed trunnion portions thereon, said collar being split into two separable parts, the split extending through said trunnion portions, said trunnion portions being threaded, and internally threaded sleeves screwed onto said trunnion portions to hold the clutch throw-out collar assembled, the trunnion portions and sleeves being tapered to afford tightening upon assembly.

3. A clutch throw-out collar comprising a ring portion and two oppositely disposed trunnion portions thereon, said collar being split into two separable parts, the split extending through said trunnion portions, said trunnion portions being threaded, and internally threaded sleeves screwed onto said trunnion portions to hold the clutch throw-out collar assembled, said sleeves having external smooth bearing surfaces for providing bearing means for mounting upon a supporting member.

4. A clutch throw-out collar comprising a ring portion and two oppositely disposed trunnion portions thereon, said collar being split into two separable parts, the split extending through said trunnion portions, said trunnion portions being threaded, and internally threaded sleeves screwed onto said trunnion portions to hold the clutch throw-out collar assembled, the trunnion portions and sleeves being tapered to afford tightening upon assembly, said sleeves having external cylindrical bearing surfaces for providing a bearing upon a supporting member, and said ring portion having at least one recessed portion for receiving at least one bearing member for actuating the clutch throw-out mechanism.

EDWARD PADDEN.